United States Patent
Kuwayama

(10) Patent No.: US 11,052,721 B2
(45) Date of Patent: Jul. 6, 2021

(54) STABILIZER DEVICE

(71) Applicant: CHUO HATSUJO KABUSHIKI KAISHA, Nagoya (JP)

(72) Inventor: Toshio Kuwayama, Nagoya (JP)

(73) Assignee: CHUO HATSUJO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 16/976,771

(22) PCT Filed: Mar. 20, 2018

(86) PCT No.: PCT/JP2018/011075
§ 371 (c)(1),
(2) Date: Aug. 31, 2020

(87) PCT Pub. No.: WO2019/180824
PCT Pub. Date: Sep. 26, 2019

(65) Prior Publication Data
US 2021/0008950 A1 Jan. 14, 2021

(51) Int. Cl.
*B60G 17/027* (2006.01)
*B60G 21/055* (2006.01)
*B60G 17/016* (2006.01)

(52) U.S. Cl.
CPC ......... *B60G 21/055* (2013.01); *B60G 17/016* (2013.01); *B60G 2204/1222* (2013.01); *B60G 2204/41* (2013.01); *B60G 2206/427* (2013.01)

(58) Field of Classification Search
CPC .............. B60G 21/055; B60G 17/016; B60G 2204/1222; B60G 2204/41; B60G 2206/427
(Continued)

(56) References Cited

U.S. PATENT DOCUMENTS 6,428,019 B1 * 8/2002 Kincad ............ B60G 21/0553
280/124.106
6,637,757 B2 * 10/2003 Ignatius ............ B60G 17/0185
280/124.106
(Continued)

FOREIGN PATENT DOCUMENTS

JP 2001-260625 A 9/2001
JP 2007-154977 A 6/2007
(Continued)

OTHER PUBLICATIONS

International Search Report and Written Opinion for International application No. PCT/JP2018/011075, dated Jun. 12, 2018, ISA/JP.

*Primary Examiner* — Toan C To
(74) *Attorney, Agent, or Firm* — Lucas & Mercanti, LLP

(57) ABSTRACT

This stabilizer device is provided with first and second stabilizers and a joint device that can be switched between and ON-state and an OFF-state. The ON-state is a state in which a force inputted to one of the stabilizers can be transmitted to the other stabilizer, and the OFF-state is a state in which said transmission is disabled. The joint device has at least one engagement part that can be displaced to an engagement position and a non-engagement position. In addition, the joint device assumes the ON-state when the at least one engagement part is in the engagement position, and assumes the OFF-state when the at least one engagement part is in the non-engagement position.

4 Claims, 13 Drawing Sheets

(58) Field of Classification Search
USPC .......... 280/124.13, 124.149, 124.152, 5.511
See application file for complete search history.

(56) References Cited

U.S. PATENT DOCUMENTS

| | | | | |
|---|---|---|---|---|
| 7,207,574 | B2* | 4/2007 | Gradu | ................ B60G 21/0555 |
| | | | | 267/277 |
| 7,309,074 | B2* | 12/2007 | Taneda | ................ B60G 17/019 |
| | | | | 280/124.106 |
| 7,832,739 | B2* | 11/2010 | Pinkos | ............... B60G 21/0556 |
| | | | | 280/5.511 |
| 2002/0121748 | A1* | 9/2002 | Ignatius | ............. B60G 21/0556 |
| | | | | 280/5.511 |
| 2005/0110228 | A1* | 5/2005 | Fujimori | ............ B60G 21/0558 |
| | | | | 280/5.511 |
| 2005/0121841 | A1* | 6/2005 | Gradu | ................ B60G 21/0556 |
| | | | | 267/186 |
| 2005/0236793 | A1* | 10/2005 | Taneda | ............... B60G 21/0555 |
| | | | | 280/124.107 |
| 2007/0108707 | A1* | 5/2007 | Kobayashi | ......... B60G 21/0555 |
| | | | | 280/5.511 |
| 2013/0307241 | A1* | 11/2013 | Brown | .................... F16H 25/20 |
| | | | | 280/124.107 |
| 2019/0241039 | A1* | 8/2019 | Simula | ............... B60G 17/0162 |

FOREIGN PATENT DOCUMENTS

| | | |
|---|---|---|
| JP | 2009-67218 A | 4/2009 |
| JP | 2015-230029 A | 12/2015 |
| WO | 2006118129 A1 | 11/2006 |

\* cited by examiner

STABILIZER DEVICE

CROSS-REFERENCE TO RELATED APPLICATION

This application is a 371 U.S. national stage of PCT/JP2018/011075, filed Mar. 20, 2018, the contents of which are incorporated herein by reference.

FIELD OF THE INVENTION

The present disclosure relates to a stabilizer device for suppressing tilt of a vehicle body.

BACKGROUND OF THE INVENTION

For example, in the stabilizer device of patent document 1, a first stabilizer and a second stabilizer are connected to each other via a friction clutch mechanism.

PRIOR ART DOCUMENT

Patent Document

Patent document 1: Japanese Patent Application Laid-Open No. 2001-260625

SUMMARY OF THE INVENTION

Problem to be Solved by the Invention

In the stabilizer device of patent document 1, a torsional force input to the first stabilizer is transmitted to the second stabilizer by a frictional force generated on a contact surface between a clutch plate and a friction plate.

However, the frictional force generated on the above contact surface varies according to dimensional deviation of components constituting the clutch mechanism and others. Therefore, in the stabilizer device of patent document 1, the tilt suppression function may not be sufficiently exerted.

In view of the above problems, the present disclosure discloses one example of a stabilizer device capable of stably exerting the tilt suppression function.

Means to Solve the Problem

A stabilizer device according to one aspect of the present disclosure, used to suppress tilt of a vehicle body, comprises a first stabilizer, a second stabilizer, and an engagement device which connects the first stabilizer with the second stabilizer and can switch between a connected state and a disconnected state. Besides, the connected state refers to a state in which a force input to at least one of the first stabilizer and the second stabilizer can be transmitted to the other stabilizer. In addition, the disconnected state refers to a state in which such transmission cannot be carried out.

Moreover, the engagement device comprises: a housing fixed with the first stabilizer; and at least one snapping portion housed in the housing and displaceable between a snapping position and a non-snapping position. Besides, the snapping position refers to a position where the snapping portion is snapped with the snapped portion provided in the second stabilizer, and the non-snapping position refers to a position where the snapping portion is away from the snapped portion. Furthermore, the engagement device is in the connected state when the at least one snapping portion is located in the snapping position, and in the disconnected state when the at least one snapping portion is located in the non-snapping position.

Thus, the above stabilizer device transmits the force input to either one of the stabilizers to the other one by mechanically snapping the snapping portion with the snapped portion.

Therefore, compared with the stabilizer device of patent document 1, variation in the force transmitted from one stabilizer to the other stabilizer can be suppressed. Furthermore, in the stabilizer device, the tilt suppression function can be stably exerted as compared with the stabilizer device of patent document 1.

ILLUSTRATION OF REFERENCE NUMERALS

Figure 1:
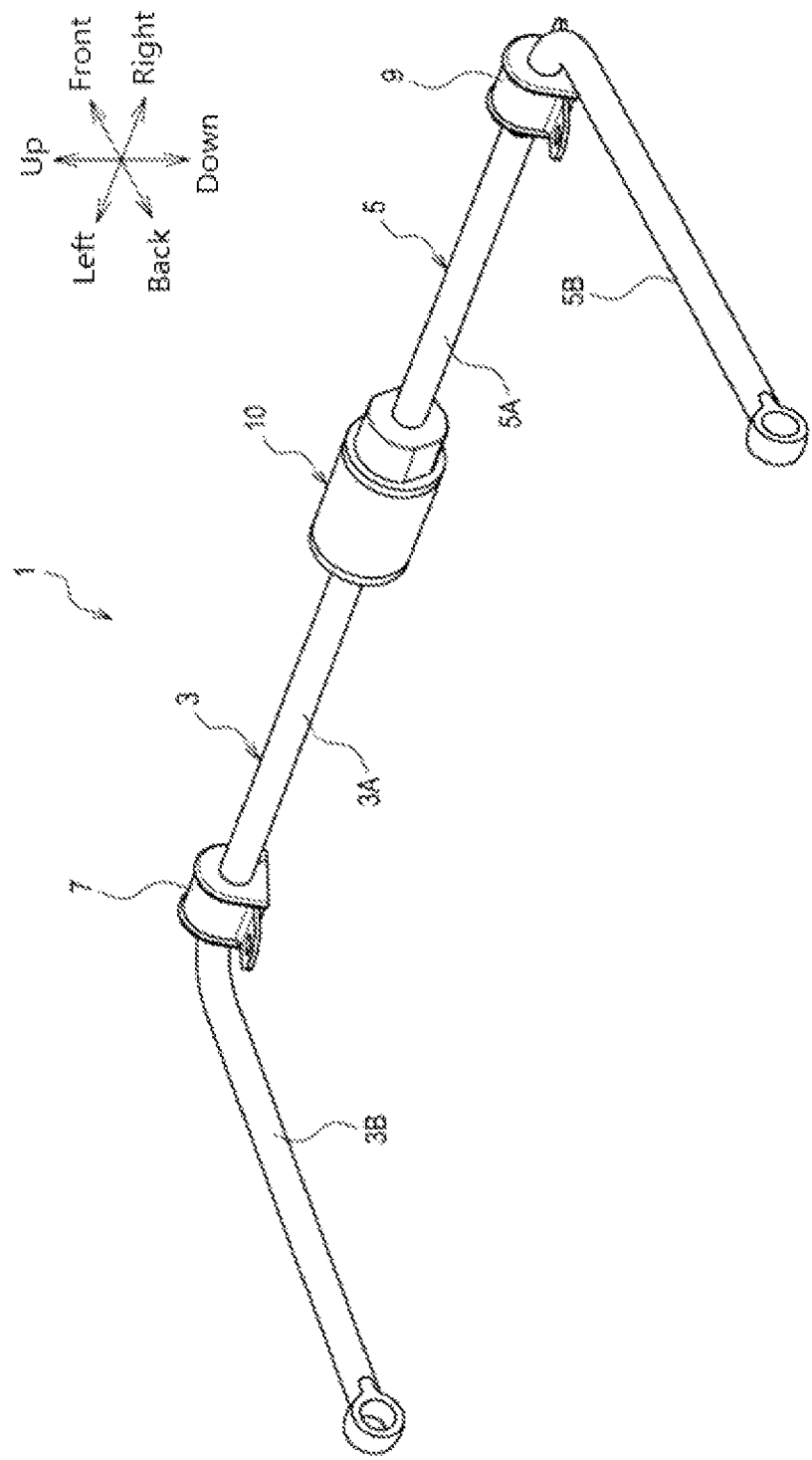
FIG. 1 is a perspective view showing a stabilizer device in a first embodiment.

1: stabilizer device,
3: first stabilizer,
3A: first torsion portion,
5: second stabilizer,
5A: second torsion portion,
5C~5E: snapped portion,
10: engagement device,
13: snapping device,
14: shell,
15A: first cover portion,
15B: second cover body,
16: snapping mechanism,
16A~16C: snapping portion, and
17: cam mechanism.

DETAILED DESCRIPTION OF EMBODIMENTS

The following "embodiment" shows one example of embodiment belonging to the technical scope of the present disclosure. That is, items defined in the claims of the patent and so on are not limited to the specific structures, configurations and so on shown in the following embodiments.

Besides, in order to make it easy to understand relationship among various drawings, arrows indicating the directions in which respective drawings are attached are described. The present disclosure is not limited by the directions in which various drawings are attached.

For a structure described at least with a reference numeral, at least one such structure is provided, unless it is described as being "one" or the like. That is, two or more such structures may be provided without referring to "one" or the like.

First Embodiment

1. Overview of Stabilizer Device

FIG. 1 shows a stabilizer device 1 in the present embodiment. The stabilizer device 1 suppresses tilt of a vehicle body (not shown). The stabilizer device 1 comprises a first stabilizer 3, a second stabilizer 5 and an engagement device 10.

The first stabilizer 3 is composed of a steel member having a torsion portion 3A and an arm portion 3B. The second stabilizer 5 is composed of a steel member having a torsion portion 5A and an arm portion 5B.

The torsion portions 3A and 5A are mainly rod-shaped portions that are torsionally deformed. An end portion of the arm portion 3B at one side thereof is connected to the torsion portion 3A, and an end portion of the arm portion 5B at one side thereof is connected to the torsion portion 5A. Besides, end portions of respective arm portions 3B and 5B at the other sides thereof are connected to the vehicle body in a rotatable manner.

The torsion portion 3A is connected to the vehicle body via a bushing 7. The torsion portion 5A is connected to the vehicle body via a bushing 9. The engagement device 10 connects the first stabilizer 3 (which is the torsion portion 3A in the present embodiment) with the second stabilizer 5 (which is the torsion portion 5A in the present embodiment).

2. Configuration of Engagement Device 2.1 Overview of Engagement Device

The engagement device 10 is a switching device configured to enable a connection state between the torsion portion 3A (hereinafter referred to as first torsion portion 3A) and the torsion portion 5A (hereinafter referred to as second torsion portion 5A) to be a connected state or a disconnected state.

In the connected state, a force input to at least one of the first torsion portion 3A and the second torsion portion 5A can be transmitted to the other torsion portion. In the disconnected state, this force cannot be transmitted.

Besides, in the present embodiment, a torsional force (rotational force) input to one torsion portion is transmitted to the other torsion portion. That is, in the connected state, the torsional force input to one torsion portion can be transmitted to the other torsion portion.

2.2 Structure of Engagement Device

<Overview of Engagement Device>

Figure 2:
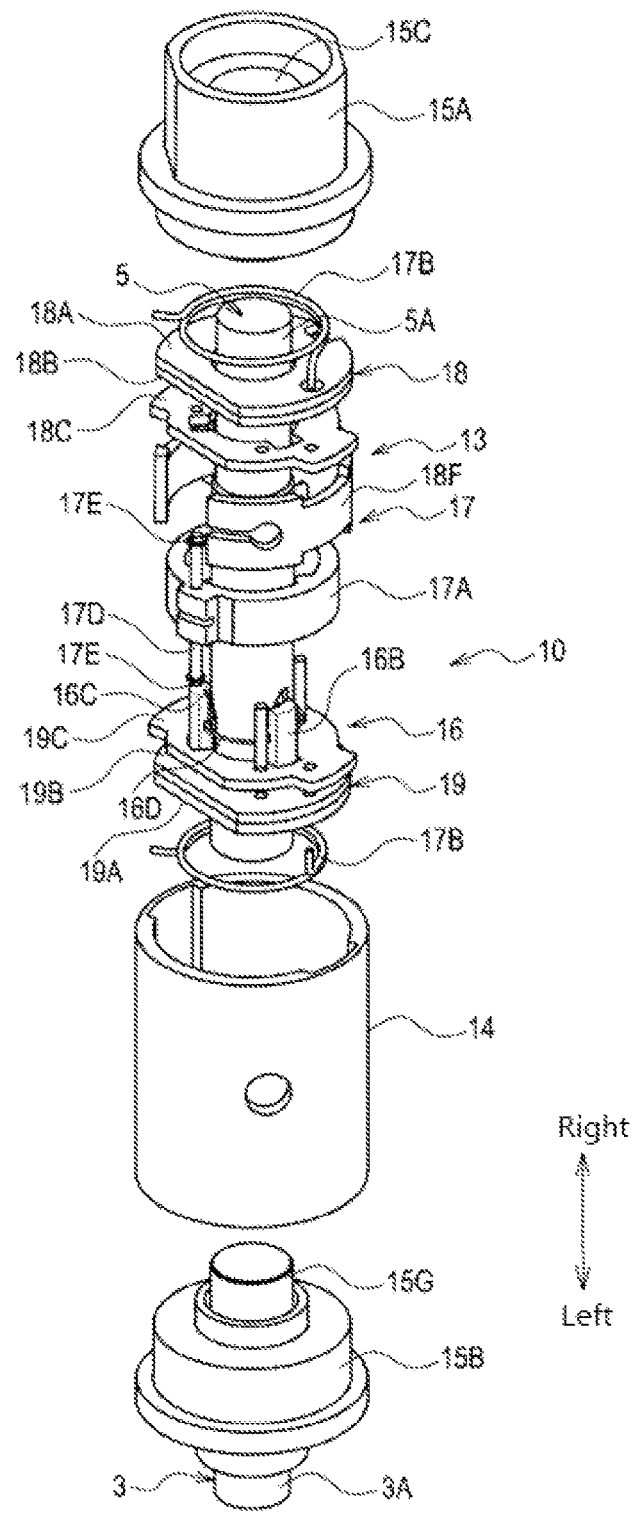
FIG. 2 is an exploded view of the stabilizer device in the first embodiment.

As shown in FIG. 2, the engagement device 10 has a snapping device 13, a shell 14, a first cover portion 15A, a second cover body 15B and so on.

That is, the shell 14, the first cover portion 15A and the second cover body 15B are components constituting the housing. The first cover portion 15A is a cover body that closes an opening of one end portion (an end portion on the right in FIG. 2) in an axial direction of the shell 14.

The second cover body 15B is a cover body that closes an opening of the other end portion (an end portion on the left in FIG. 2) in the axial direction of the shell 14. The shell 14, the first cover portion 15A and the second cover body 15B are integrated by screws, welding or other fixing methods.

Figure 3:
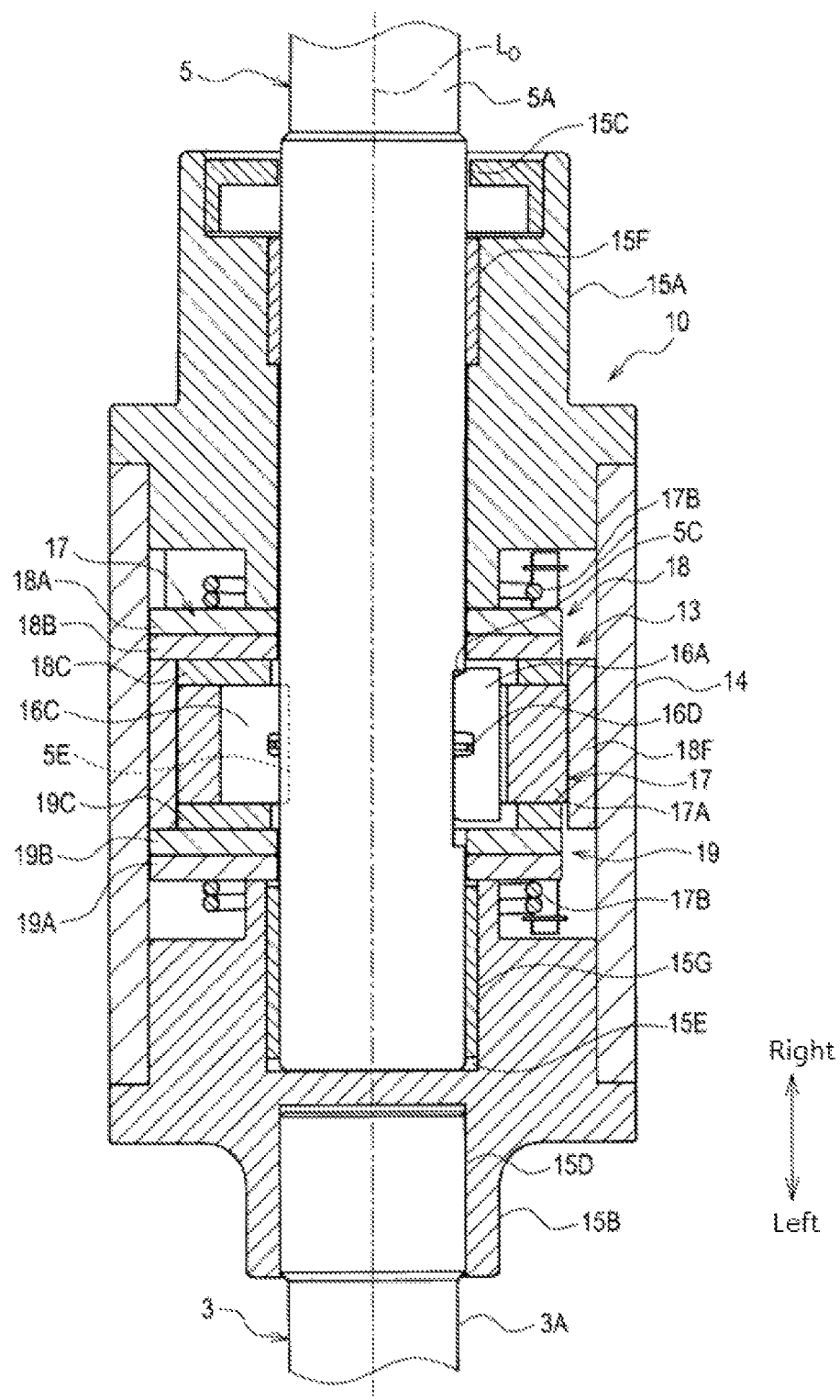
FIG. 3 is a sectional view showing configuration of an engagement device in the first embodiment.

As shown in FIG. 3, the snapping device 13 is fixed in the shell 14 in a way that the snapping device is sandwiched by the first cover portion 15A and the second cover body 15B. A through hole 15C for allowing the second torsion portion 5A to penetrate through is provided on the first cover portion 15A.

A first torsion portion 3A is fixed on the second cover body 15B. Specifically, the first torsion portion 3A is embedded in a recess 15D provided on the second cover body 15B, for example, fixed to the second cover body 15B by a fixing method such as pressing in or welding.

On an opposite side of the recess 15D in the second cover body 15B, a recess 15E in which the second torsion portion 5A can be embedded is provided. Tubular metal bearing portions 15F and 15G are inserted into the through hole 15C and the recess 15E, respectively.

The metal bearing portions 15F and 15G are in contact with an outer circumferential surface of the second torsion portion 5A in a manner of slidable contact. That is, the second torsion portion 5A is supported by the metal bearing portions 15F and 15G in a manner of being rotatable around a central axis Lo.

Furthermore, respective central axes of the through hole 15C and the recesses 15D, 15E coincide with the central axis Lo. That is, a central axis of the first torsion portion 3A and a central axis of the second torsion portion 5A coincide with the central axis Lo.

<Configuration of Snapping Device>

The snapping device 13 is a mechanism for switching between the connected state and the disconnected state. As shown in FIG. 2, the mechanism has a snapping mechanism 16, a cam mechanism 17, axial restricting portions 18 and 19 and so on.

Figure 4:
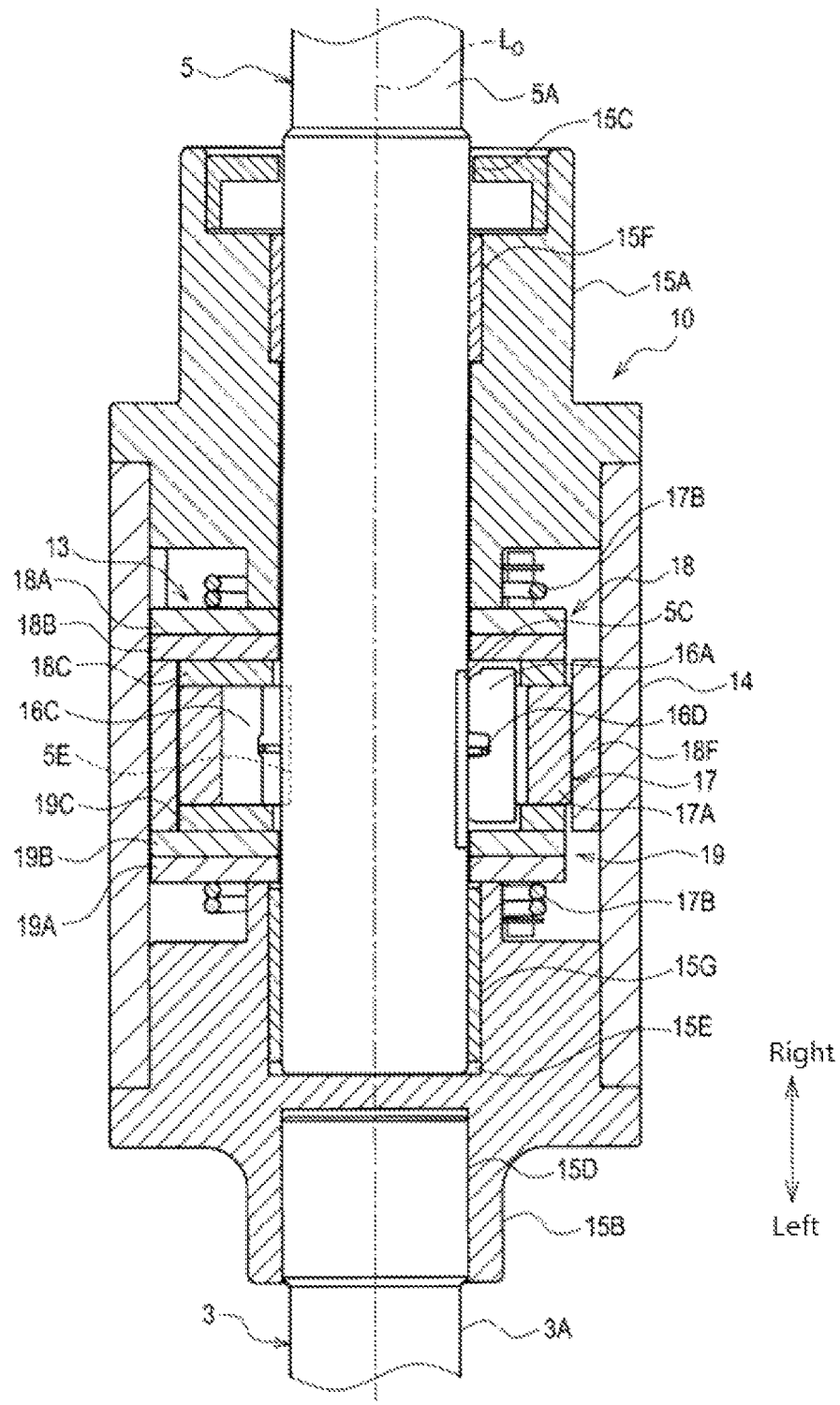
FIG. 4 is a sectional view showing configuration of the engagement device in the first embodiment.

The snapping mechanism 16 in the present embodiment has more than one (as an example, three) snapping portions 16A~16C. The respective snapping portions 16A~16C are members made of metal, and are displaced in a manner of being close to or away from the second torsion portion 5A in a direction orthogonal to the central axis Lo, as shown in FIG. 3 and FIG. 4.

Figure 5:
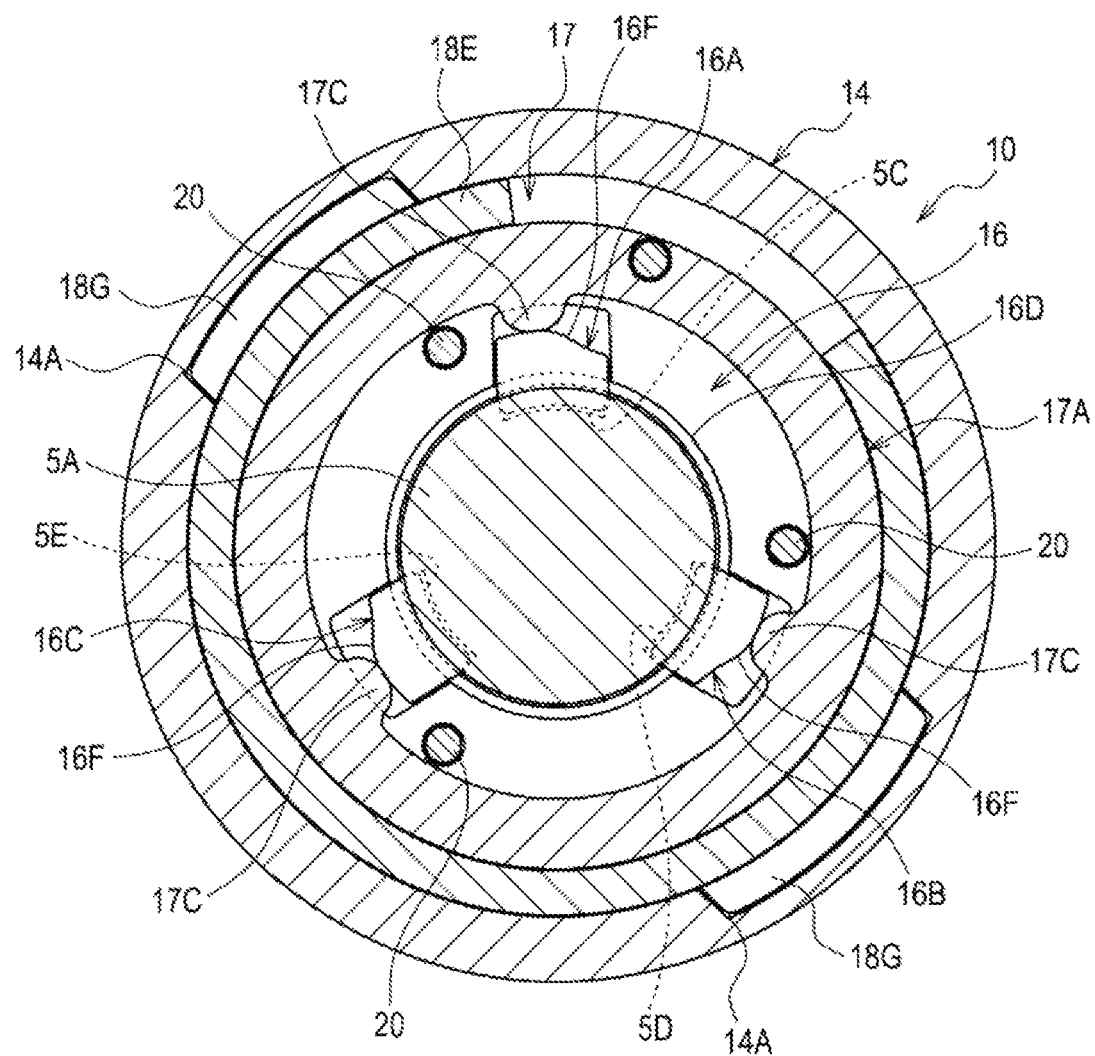
FIG. 5 is a sectional view showing configuration of the engagement device in the first embodiment.
Figure 6:
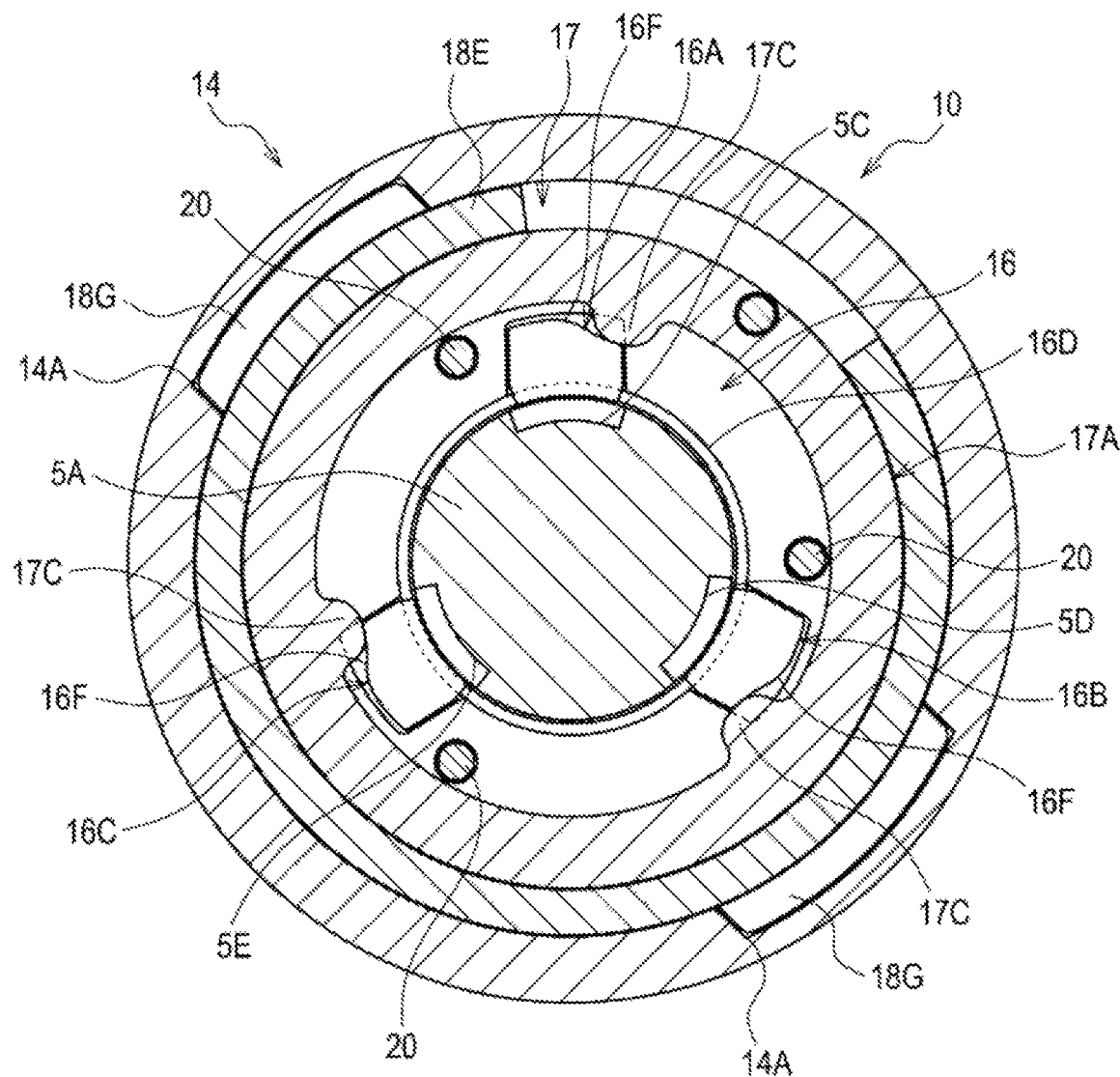
FIG. 6 is a sectional view showing configuration of the engagement device in the first embodiment.

As shown in FIG. 5 and FIG. 6, the second torsion portion 5A is provided thereon with snapped portions 5C~5E capable of being snapped with the respective snapping portions 16A~16C. The respective snapped portions 5C~5E are recesses that enable the respective snapping portions 16A~16C to be embedded therein.

Specifically, the snapped portion 5C (hereinafter referred to as first snapped portion 5C) is a recess that enables the snapping portion 16A (hereinafter referred to as first snapping portion 16A) to be embedded therein. The snapped portion 5D (hereinafter referred to as second snapped portion 5D) is a recess that enables the snapping portion 16B (hereinafter referred to as second snapping portion 16B) to be embedded therein. The snapped portion 5E (hereinafter referred to as third snapped portion 5E) is a recess that enables the snapping portion 16C (hereinafter referred to as third snapping portion 16C) to be embedded therein.

Moreover, the respective snapping portions 16A~16C are in the connected state when their positions are the snapping positions where the snapping portions are embedded in the snapped portions 5C~5E (refer to FIG. 5). The respective snapping portions 16A~16C are in the disconnected state when their positions are the non-snapping positions away from the respective snapped portions 5C~5E (refer to FIG. 6).

As shown in FIG. 5 and FIG. 6, the respective snapping portions 16A~16C surround an outer circumferential side of the second torsion portion 5A, and are configured at equal intervals (as an example, intervals of 120°) along an outer circumferential direction of the second torsion portion 5A.

Figure 7:
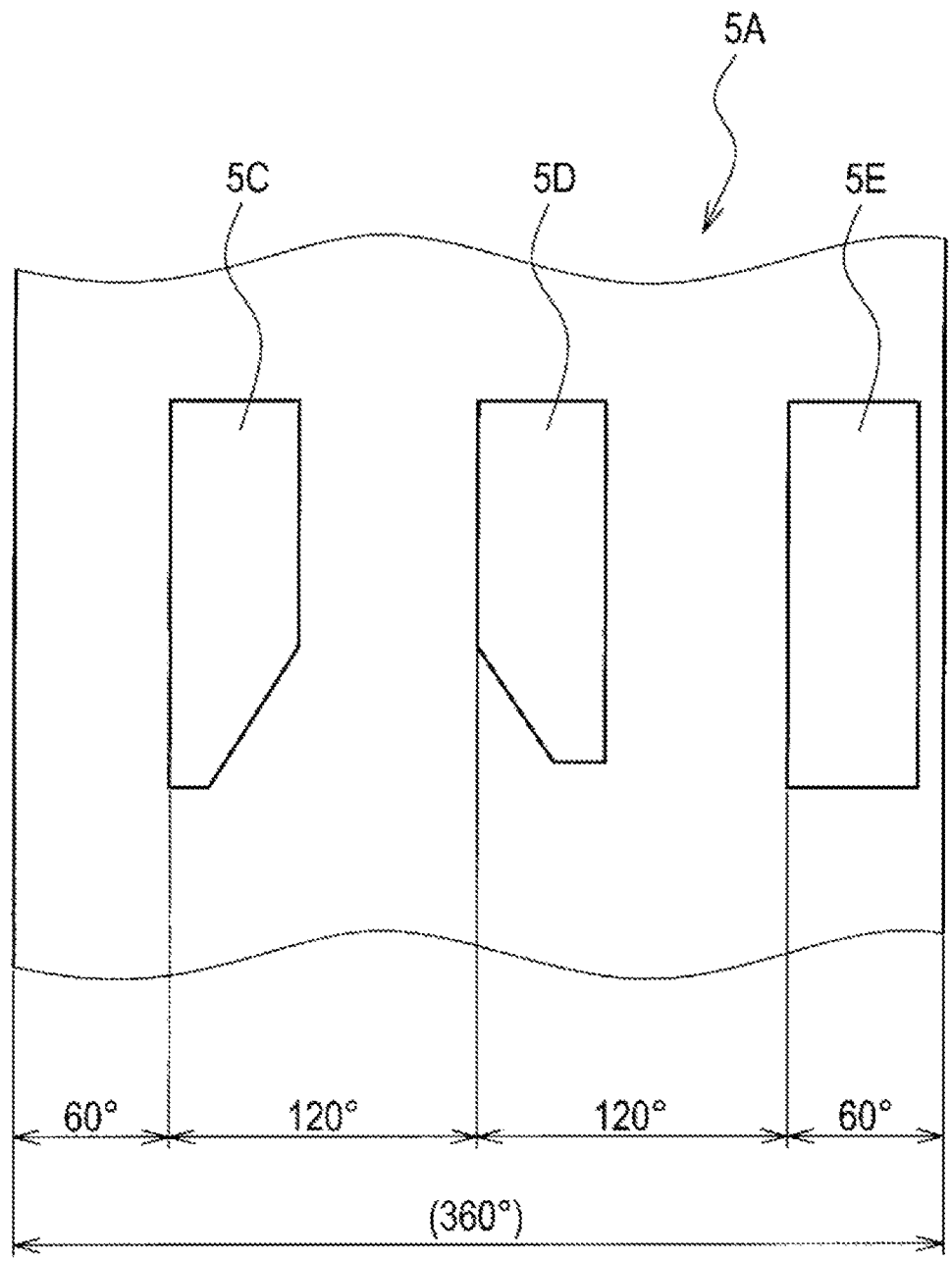
FIG. 7 is a view of a snapped portion in the first embodiment.

As shown in FIG. 7, the respective snapped portions 5C~5E are provided at equal intervals, and are configured at positions corresponding to the respective snapping portions 16A~16C. As an example, the second snapped portion 5D is provided at a position offset by 120° in the outer circumferential direction with respect to the first snapped portion 5C.

The third snapped portion 5E is provided at a position offset by 120° in the outer circumferential direction with respect to the second snapped portion 5D. The first snapped portion 5C is provided at a position offset by 120° in the outer circumferential direction with respect to the third snapped portion 5E.

In the present embodiment, holes of the respective snapped portions 5C~5E are different in shape. Moreover, the first snapping portion 16A is in a shape that cannot be snapped with the second snapped portion 5D and the third snapped portion 5E, that is, a shape that cannot be fitted with the second snapped portion 5D and the third snapped portion 5E. The second snapping portion 16B is in a shape that cannot be snapped with the first snapped portion 5C and the third snapped portion 5E.

The third snapping portion 16C is in a shape that cannot be snapped with the second snapped portion 5D and the first snapped portion 5C. Therefore, when the respective snapping portions 16A~16C are in the connected state, a relative phase angle of the second torsion portion 5A with respect to the first torsion portion 3A is always the same.

Besides, the relative phase angle of the torsion portion refers to an angle formed by rotating the torsion portion from a predetermined reference position along the outer circumferential direction of the torsion portion around the central axis Lo. That is, in the present embodiment, if the respective snapping portions 16A~16C are displaced to the snapping positions and changed to be in the connected state, an angle of the arm portion 3B and an angle of the arm portion 5B are always predetermined angles.

As shown in FIG. 4, on the side of the second torsion portion 5A of each of the snapping portions 16A~16C (i.e. the side of each snapping portion where the second torsion portion 5A is located), at least one separation spring 16D is provided. The separation springs 16D apply an elastic force to the respective snapping portions 16A~16C to make the respective snapping portions 16A~16C displaced from the positions where the snapping portions are in the connected state to the positions where the snapping portions are in the disconnected state.

The separation spring 16D is an annular spring with a portion being open or cut, like a C shape or the like. That is, the separation springs 16D apply the above elastic force to the respective snapping portions 16A~16C through restoration in a manner of increasing the radius of curvature.

As shown in FIG. 6, the separation springs 16D are configured at portions of the respective snapping portions 16A~16C facing the snapped portions 5C~5E. Moreover, recesses for allowing the separation springs 16D to be embedded therein are provided at the portions of the respective snapping portions 16A~16C configured with the separation springs 16D.

<Cam Mechanism>

The cam mechanism 17 makes the respective snapping portions 16A~16C displaced from the positions where the snapping portions are in the disconnected state to the positions where the snapping portions are in the connected state. That is, the cam mechanism 17 applies a force against the elastic force of the separation spring 16D to the respective snapping portions 16A~16C, such that the respective snapping portions 16A~16C are displaced from the positions where the snapping portions are in the disconnected state to the positions where the snapping portions are in the connected state.

As shown in FIG. 2, the cam mechanism 17 in the present embodiment has a cam ring 17A and at least one torsion spring 17B. The cam ring 17A is a member made of metal, and can rotate around the second torsion portion 5A as the center.

Moreover, in the case of disconnected state shown in FIG. 6, if the cam ring 17A is rotated to the left, the respective snapping portions 16A~16C are displaced from the positions where the snapping portions are in the disconnected state to the positions where the snapping portions are in the connected state. On the other hand, in the case of connected state as shown in FIG. 5, if the cam ring 17A is rotated to the right, the respective snapping portions 16A~16C are displaced from the positions where the snapping portions are in the connected state to the positions where the snapping portions are in the disconnected state.

Figure 8:
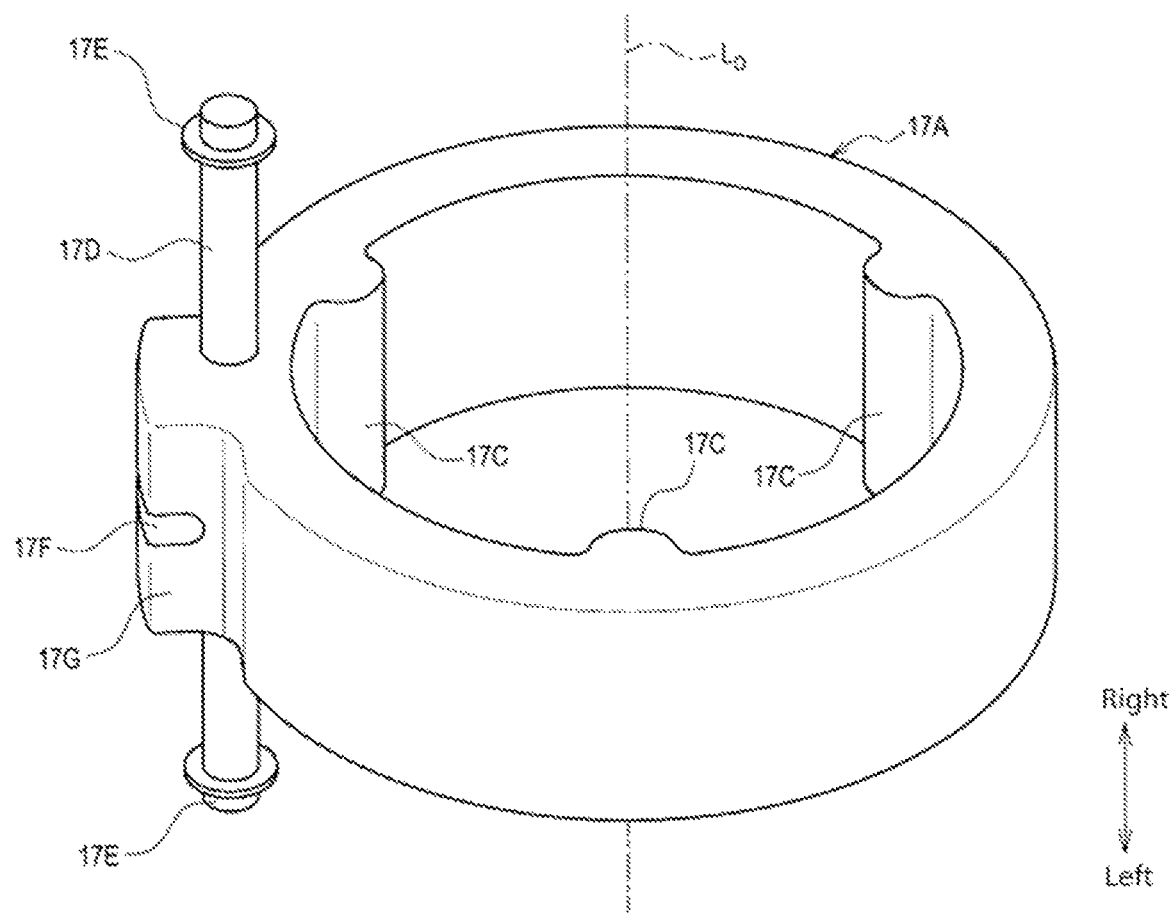
FIG. 8 is a perspective view showing a cam ring in the first embodiment.

That is, as shown in FIG. 8, on an inner circumferential surface of the annular cam ring 17A, a plurality of protrusions 17C protruding toward the center of the cam ring are provided. The plurality of protrusions 17C and the plurality of snapping portions 16A~16C are provided in the same number. Besides, the respective protrusions 17C are in sliding contact with respective cam surfaces 16F (refer to FIG. 5 and so on) provided on the plurality of snapping portions 16A~16C.

A rod portion 17D is provided on the outer periphery of the cam ring 17A. On an outer circumferential surface of the cam ring 17A, the rod portion 17D extends in a direction parallel to the central axis Lo. At least one locking portion 17E is provided on the rod portion 17D.

Figure 9:
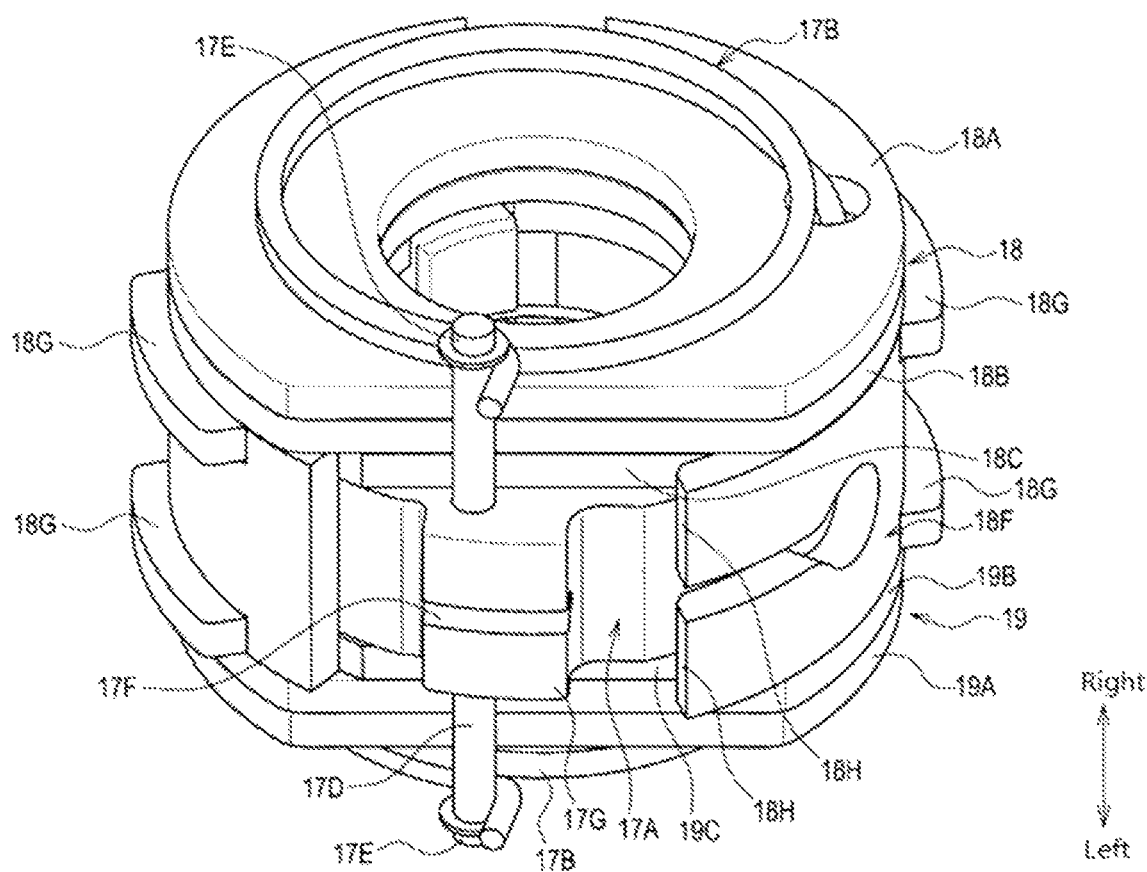
FIG. 9 is a perspective view showing a snapping mechanism in the first embodiment.

As shown in FIG. 9, the locking portion 17E is hooked by one end portion of the torsion spring 17B, and is locked with this end portion. In the present embodiment, an intermediate portion of the rod portion 17D in an extending direction thereof is coupled with the cam ring 17A, and two end portions of the rod portion in the extending direction are each provided with the locking portion 17E.

That is, in the present embodiment, two torsion springs 17B are provided, and the respective torsion springs 17B are provided at one end portion and the other end portion in the axial direction with the cam ring 17A interposed therebetween. The two torsion springs 17B apply an elastic force to the cam ring 17A in a direction in which the respective snapping portions 16A~16C are displaced to the positions where the snapping portions are in the connected state.

A connection locking portion 17F can be provided on the rod portion 17D or the cam ring 17A. In the present embodiment, as one example, the cam ring 17A is provided thereon with the connection locking portion 17F. The connection locking portion 17F is connected with one end portion of a control wire (not shown).

The control wire is operated by a driver or passenger. If the control wire is operated, a rotational force is applied to the cam ring 17A in a direction in which the respective snapping portions 16A~16C are displaced from the positions where the snapping portions are in the connected state to the positions where the snapping portions are in the disconnected state.

Therefore, if the control wire is operated, the respective snapping portions 16A~16C are brought into the disconnected state. Moreover, if an operation force of the control wire disappears, the respective snapping portions 16A~16C are returned to and maintained in the connected state by the elastic force of the two torsion springs 17B.

<Axial Restricting Portion>

As shown in FIG. 4, the axial restricting portion 18 restricts positions of the respective snapping portions 16A~16C in the direction of the central axis Lo through contact with the respective snapping portions 16A~16C from one side (right side in FIG. 4) in the direction of the central axis Lo.

The axial restricting portion 19 restricts positions of the respective snapping portions 16A~16C in the direction of the central axis Lo through contact with the respective snapping portions 16A~16C from the other side (left side in FIG. 4) in the direction of the central axis Lo.

Besides, the axial restricting portion 18 and the axial restricting portion 19 have structures which are symmetrical with the axis of symmetry at the position of the snapping mechanism 16 as a center. That is, the axial restricting portion 18 and the axial restricting portion 19 are configured to be left-right symmetrical.

As shown in FIG. 2, the axial restricting portion 18 has a first bottom plate 18A, a second bottom plate 18B, a guide plate 18C and so on. The axial restricting portion 19 similarly also at least has a first bottom plate 19A, a second bottom plate 19B and a guide plate 19C.

Holes through which pins 20 (refer to FIG. 11) can penetrate are provided on the second bottom plate 18B, the guide plate 18C, the second bottom plate 19B and the guide plate 19C. The first bottom plate 18A and the second bottom plate 18B are integrated by a joining method such as welding. Similarly, the first bottom plate 19A and the second bottom plate 19B are integrated by a joining method such as welding.

Thus, between the first bottom plate 18B and the first bottom plate 19B, the snapping mechanism 16, i.e. the snapping portions 16A~16C in a positioned state, is accommodated. Besides, the first bottom plates 18A and 19A and the second bottom plates 18B and 19B in the present embodiment are formed by stamping (for example, punching).

Figure 10:
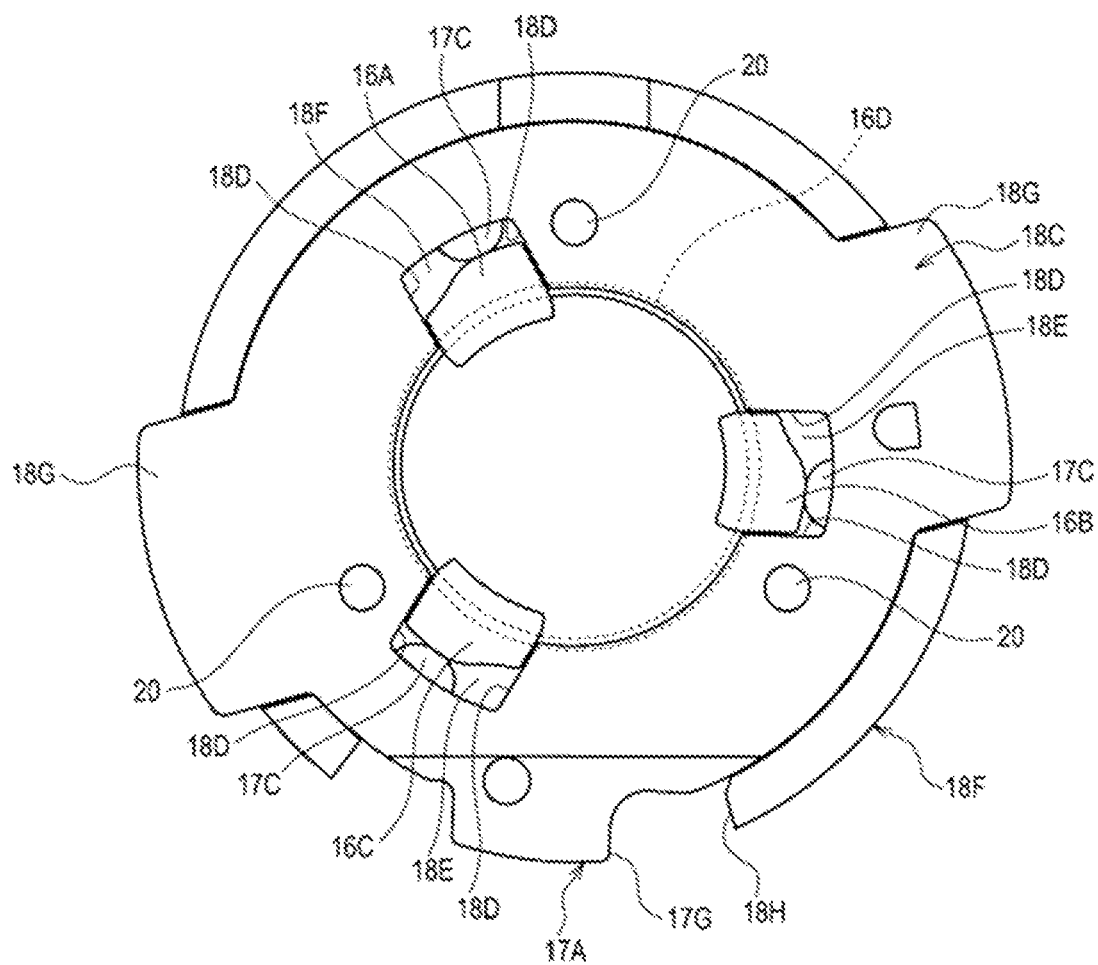
FIG. 10 is a front view showing the snapping mechanism in the first embodiment.

As shown in FIG. 10, a plurality of circumferential restricting portions 18D are provided on the guide plate 18C. The respective circumferential restricting portions 18D can be in sliding contact with respective corresponding snapping portions 16A~16C. Thus, the respective snapping portions 16A~16C are restricted from being displaced in the circumferential direction centered on the second torsion portion 5A.

That is, the two circumferential restricting portions 18D facing each other constitute side walls of a groove portion 18E extending in a radial direction. As shown in FIG. 3, one end of each of the snapping portions 16A~16C in the direction of the central axis Lo is in contact with the guide plate 18C in a manner of slidable contact.

The guide plate 19C also has the same structure as the guide plate 18C. Therefore, the other end of each of the respective snapping portions 16A~16C in the direction of the central axis Lo is in contact with the guide plate 19C in a manner of slidable contact. That is, the respective snapping portions 16A~16C are embedded into respective corresponding groove portions 18E in a manner of slidable contact. Therefore, the respective snapping portions 16A~16C can be displaced only in the radial direction with respect to the second torsion portion 5A.

As shown in FIG. 5, at least one (as an example, two) protrusion 18G is provided on outer peripheries of the guide plate 18C and the guide plate 19C. The protrusion 18G is embedded into a recess 14A provided on an inner wall of the shell 14.

Therefore, the torsional force input to the second torsion portion 5A, after being transmitted to the guide plate 18C and the guide plate 19C via the snapping portions 16A~16C, is transmitted to the first torsion portion 3A via the shell 14 and the second cover body 15B (refer to FIG. 3).

Figure 11:
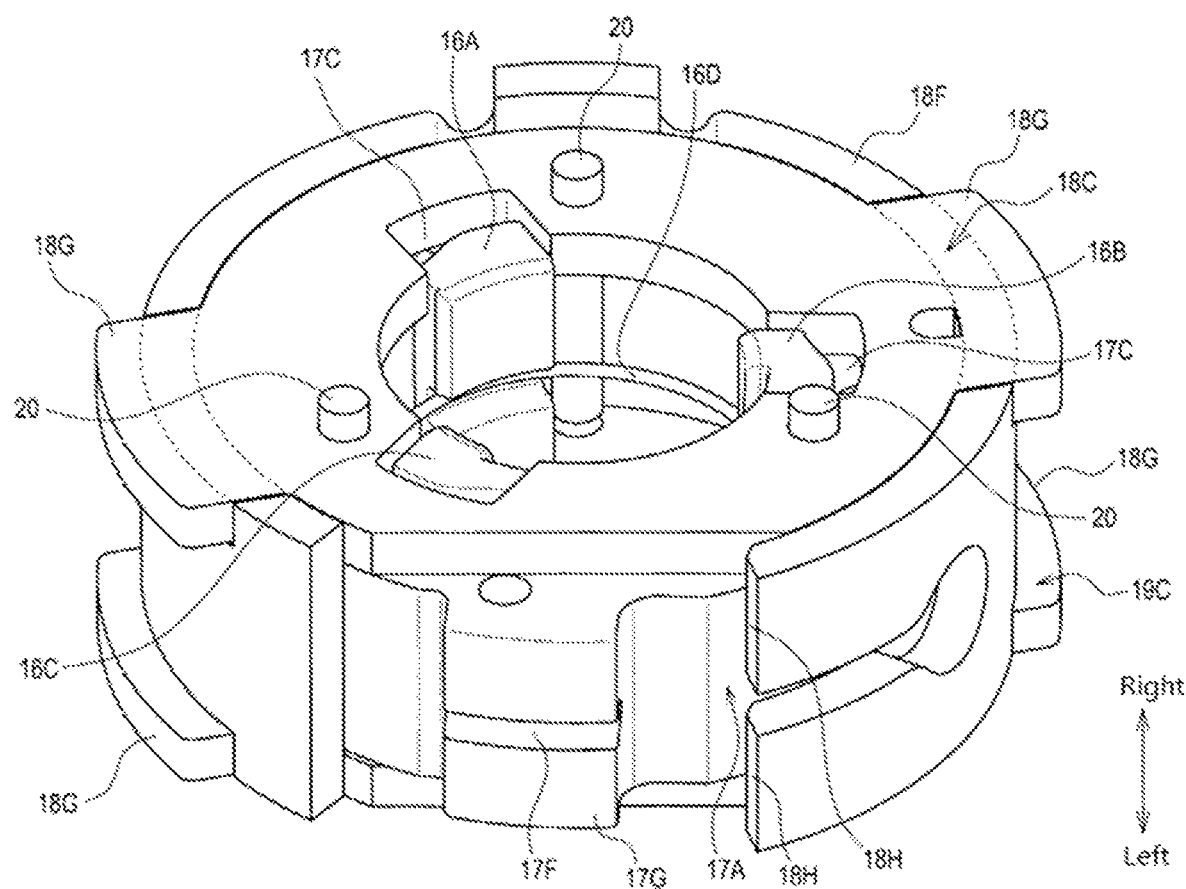
FIG. 11 is a perspective view showing the snapping mechanism in the first embodiment.

A stop tube 18F shown in FIG. 11 is a cylindrical member that can be in sliding contact with the outer circumferential surface of the cam ring 17A. The stop tube 18F guides the rotation of the cam ring 17A and receives a force applied to a radial direction of the cam ring 17A.

Figure 12:
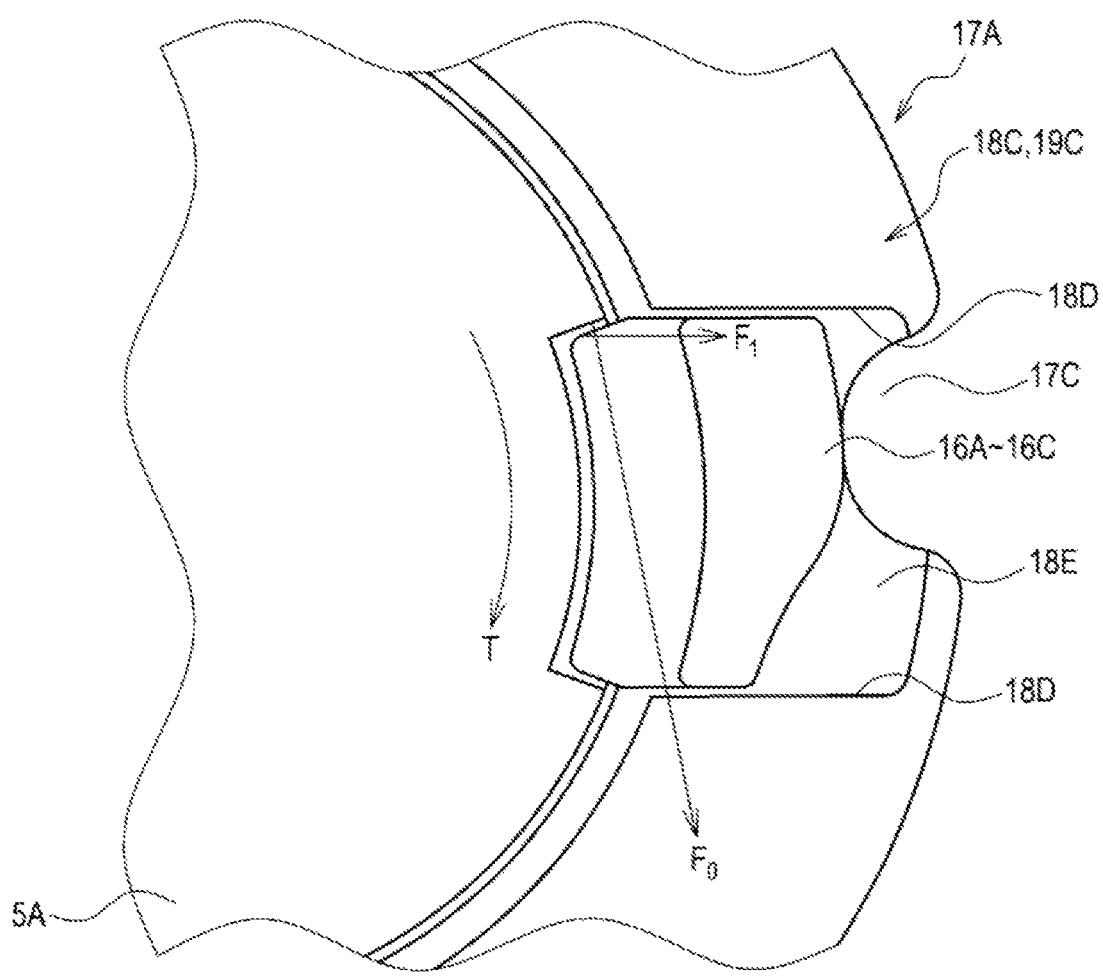
FIG. 12 is a view showing a contact portion between the cam ring and the snapping portion in the first embodiment.

That is, as shown in FIG. 12, if a torsional force T is applied to the second torsion portion 5A, a force Fo is generated at contact portions between the respective snapping portions 16A~16C and the respective snapped portions 5C~5E. Each of the snapping portions 16A~16C is in a tapered shape, and the contact portions between the respective snapping portions 16A~16C and the respective snapped portions 5C~5E are inclined with respect to a radial direction of the second torsion portion 5A.

Therefore, a force F1 of radial component of the force Fo is applied via the protrusion 17C to the cam ring 17A, with the force in the direction in which the diameter of the cam ring 17A is expanded. Moreover, the stop tube 18F bears the force applied to the cam ring 17A in the direction in which the diameter of the cam ring 17A is expanded.

As shown in FIG. 11, a stop portion 17G protruding in the radial direction is provided on the cam ring 17A. The stop tube 18F is provided thereon with an abutted portion 18H. When the cam ring 17A is rotated from the position where the snapping portions are in the connected state to the position where the snapping portions are in the disconnected state, the stop portion 17G comes into contact with the abutted portion 18H.

If the stop portion 17G is rotated to come into contact with the abutted portion 18H, the cam ring 17A cannot be rotated in the same direction. Therefore, the cam ring 17A is restrained from being rotated to the position of the protrusion 17C away from the respective snapping portions 16A~16C.

2.3 Movement of Snapping Mechanism

When the control wire is not operated, the respective snapping portions 16A~16C are snapped with the snapped portions 5C~5E by the elastic force of the torsion spring 17B, and the engagement device 10 is in the connected state (refer to FIG. 3 and FIG. 5).

If the control wire is operated in a manner of pulling the control wire, the cam ring 17A is rotated. Thus, the respective snapping portions 16A~16C are away from the snapped portions 5C~5E by the elastic force of the separation spring 16D, and the engagement device 10 is in the disconnected state (refer to FIG. 4 and FIG. 6).

In the disconnected state, when the operation of the control wire is released, the cam ring 17A is rotated by the elastic force of the torsion spring 17B, the respective snapping portions 16A~16C are snapped with the snapped portions 5C~5E, and the engagement device 10 is returned to the connected state.

3. Characteristics of the Stabilizer Device in the Present Embodiment

The stabilizer device 1 in the present embodiment transmits the torsional force input to either one of the stabilizers to the other one through mechanical snapping of the respective snapping portions 16A~16C with the respective snapped portions 5C~5E.

Therefore, the torsional force that can be transmitted varies little compared with the friction stabilizer device of patent document 1. Furthermore, the stabilizer device 1 in the present embodiment can stably exert the tilt suppression function compared with the stabilizer device of patent document 1.

The first snapping portion 16A is in a shape that cannot be snapped with the second snapped portion 5D and the third snapped portion 5E. The second snapping portion 16B is in a shape that cannot be snapped with the first snapped portion 5C and the third snapped portion 5E.

The third snapping portion 16C is in a shape that cannot be snapped with the second snapped portion 5D and the first snapped portion 5C. Therefore, when the respective snapping portions 16A~16C are in the connected state, a relative phase angle of the second torsion portion 5A with respect to the first torsion portion 3A is always the same.

Therefore, the offset of the relative phase angle between the first torsion portion 3A and the second torsion portion 5A can be suppressed. Moreover, in the present embodiment, there is no need for a device for detecting the offset of the relative phase angle, such as a position detection device, therefore, the manufacturing cost of the stabilizer device 1 can be reduced.

Besides, the stabilizer device in the description of WO2006/118129 (hereinafter referred to as patent document 2) has a screw mechanism, a nut snapped with this screw mechanism, a rotary actuator and so on, and the rotary actuator has two operating oil chambers arranged in a manner of covering the nut.

Moreover, in the stabilizer device described in patent document 2, transmission of a torsional force input to the first stabilizer to the second stabilizer is switched by controlling inlet and outlet of the operating oil in the two operating oil chambers.

Therefore, in the stabilizer device of patent document 2, there are following technical problems. Namely, (1) screw machining, cylinder mechanism, hydraulic seal and other high-precision components are required, thus the cost is high. (2) There is a need for configuration capable of withstanding hydraulic pressure, as a result, the size and the weight are increased. (3) As a switching mechanism for switching to a connected state or a disconnected state, piping, a switching valve, a control device and a valve driving device are required, so that the space, the cost and the weight are further increased. (4) The operating oil needs to be treated during maintenance and during failure, thus the maintainability is poor. (5) In order to prevent the offset of the relative phase angle between the first stabilizer and the second stabilizer, a position detection device, for example, is required, which accordingly gets the cost increased.

In this regard, the stabilizer device 1 in the present embodiment does not have any of the above-described technical problems (1)~(5), and is more advantageous than the stabilizer device of patent document 2 in terms of space, cost and weight.

Second Embodiment

In the above embodiment, the respective snapped portions 5C~5E are provided in a state of being arranged in the outer circumferential direction. In this regard, as shown in FIG. 13, in the present embodiment, the respective snapped portions 5C~5E are provided at positions offset in the direction of the central axis Lo and the outer circumferential direction.

Therefore, in the present embodiment, the first snapping portion 16A cannot be snapped with the second snapped portion 5D and the third snapped portion 5E. The second snapping portion 16B cannot be snapped with the first snapped portion 5C and the third snapped portion 5E.

The third snapping portion 16C cannot be snapped with the second snapped portion 5D and the first snapped portion 5C. Therefore, when the respective snapping portions 16A~16C are located in the snapping positions, the relative phase angle of the second torsion portion 5A with respect to the first torsion portion 3A is always the same.

Figure 13:
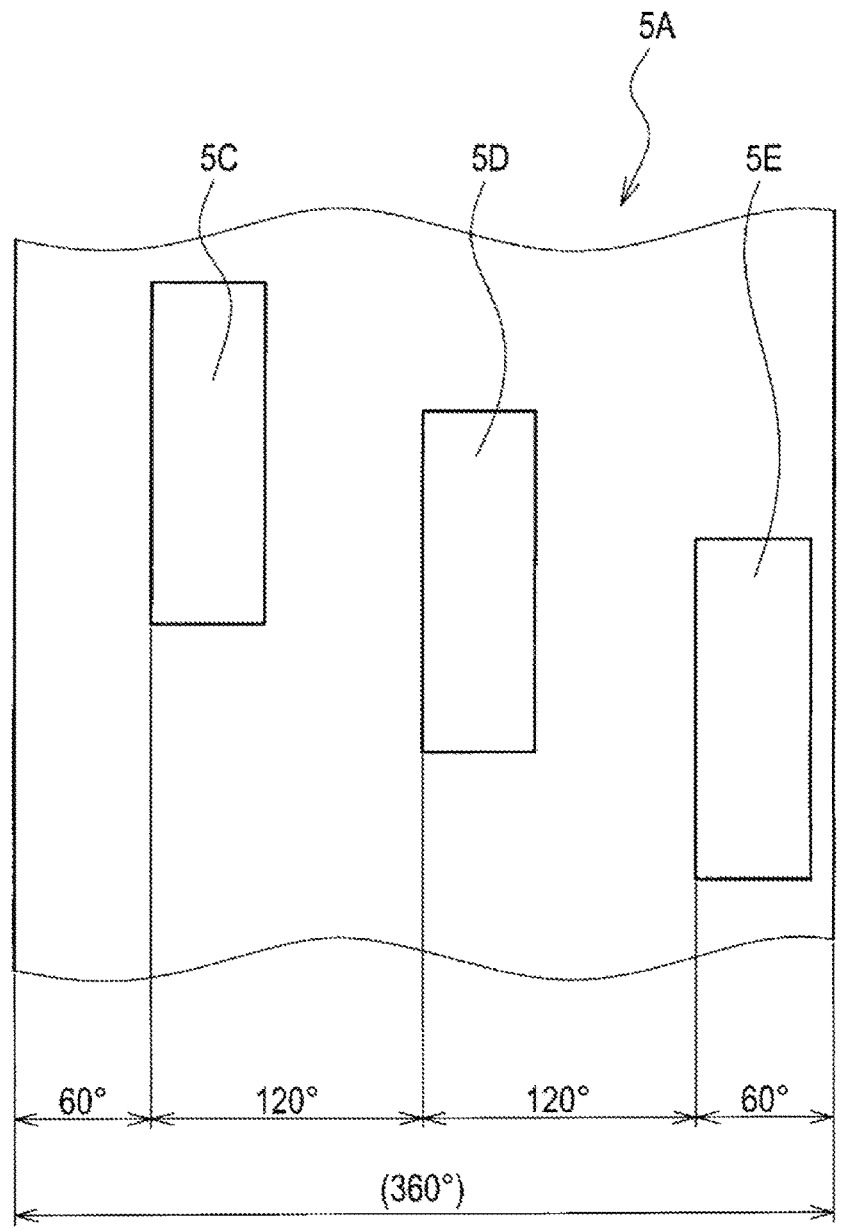
FIG. 13 is a view of a snapped portion in a second embodiment.

Besides, the respective snapped portions 5C~5E shown in FIG. 13 are in the same shape. However, the respective snapped portions 5C~5E may be in shapes different from each other. Besides, the same constituent elements in FIG. 13 as those in the first embodiment and the like are denoted by the same reference numerals as those in the first embodiment. Therefore, the description in the second embodiment overlapping with that in the first embodiment is omitted.

Other Embodiments

In the above embodiments, three snapping portions 16A~16C are provided. However, the present disclosure is not limited thereto. That is, the present disclosure, for example, may be a structure configured with one snapping portion and one snapped portion, or may be a structure configured with two or more snapping portions and two or more snapped portions.

The structure of the engagement device 12 is not limited to the structure shown in the above embodiments. That is, the engagement device 12 may be of any structure as long as it is a structure that can switch between the connected state and the disconnected state.

In the above embodiments, a phase angle maintaining mechanism is provided, wherein when in the connected state, the phase angle maintaining mechanism is used for making the relative phase angle of the second torsion portion 5A with respect to the first torsion portion 3A be the same. However, the present disclosure is not limited thereto. That is, the present disclosure may be, for example, a structure without a phase angle maintaining mechanism.

In the above embodiments, the cam ring 17A is rotated by the control wire. However, the present disclosure is not limited thereto. That is, for example, the cam ring 17A can be rotated by an electric actuator such as an electromagnet.

The engagement device 10 in the above embodiments can transmit the torsional force intermittently. However, the present disclosure is not limited thereto. That is, the present disclosure may also be applied to a device capable of intermittently transmitting forces other than torsional force such as bending moment.

Moreover, the present disclosure is not limited to the above embodiments, as long as it is complied with the gist of the structure described in the patent claims. Therefore, at least two of the above embodiments may be combined.

What is claimed is:

1. A stabilizer device, configured to suppress tilt of a vehicle body, comprising:
   a first stabilizer;
   a second stabilizer; and
   an engagement device, wherein the engagement device connects the first stabilizer with the second stabilizer, and is configured to be capable of switching between a connected state and a disconnected state;

the connected state refers to a state in which a force input to at least one stabilizer of the first stabilizer and the second stabilizer is capable of being transmitted to the other stabilizer, and the disconnected state refers to a state in which the transmission is incapable of being carried out;

the engagement device comprises:

a housing, fixed with the first stabilizer; and at least one snapping portion, housed in the housing, and configured to be displaceable between a snapping position and a non-snapping position, wherein the snapping position refers to a position where the snapping portion is snapped with a snapped portion provided in the second stabilizer, and the non-snapping position refers to a position where the snapping portion is away from the snapped portion, wherein the snapped portion is a recess provided in the second stabilizer; and the engagement device is configured to be in the connected state when the at least one snapping portion is located in the snapping position, and in the disconnected state when the at least one snapping portion is located in the non-snapping position.

2. The stabilizer device according to claim 1, wherein a torsional force input to the one stabilizer is capable of being transmitted to the other stabilizer when the engagement device is in the connected state.

3. The stabilizer device according to claim 2, wherein, a first snapping portion is provided as the snapping portion, and a first snapped portion is provided as the snapped portion;

a second snapped portion is provided as the snapped portion at a position in the second stabilizer offset from the first snapped portion along an outer circumferential direction, and a second snapping portion is provided in the housing, with the second snapping portion as the snapping portion being capable of being snapped with the second snapped portion, wherein, the first snapping portion is incapable of being snapped with the second snapped portion, and the second snapping portion is incapable of being snapped with the first snapped portion.

4. The stabilizer device according to claim 2, wherein, a first snapping portion is provided as the snapping portion, and a first snapped portion is provided as the snapped portion;

a second snapped portion is provided in the second stabilizer at a position offset from the first snapped portion along an axial direction and offset from the first snapped portion along an outer circumferential direction; and a second snapping portion is provided in the housing, with the second snapping portion being capable of being snapped with the second snapped portion.

* * * * *